US010357786B2

(12) United States Patent
Fonser et al.

(10) Patent No.: US 10,357,786 B2
(45) Date of Patent: Jul. 23, 2019

(54) CENTRIFUGAL SEPARATOR

(71) Applicant: ALFA LAVAL CORPORATE AB, Lund (SE)

(72) Inventors: Per Fonser, Enskededalen (SE); Jan Skoog, Skogås (SE); Olle Törnblom, Tullinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 61 days.

(21) Appl. No.: 15/309,298

(22) PCT Filed: May 7, 2015

(86) PCT No.: PCT/EP2015/060098
§ 371 (c)(1),
(2) Date: Nov. 7, 2016

(87) PCT Pub. No.: WO2015/176968
PCT Pub. Date: Nov. 26, 2015

(65) Prior Publication Data
US 2017/0173596 A1    Jun. 22, 2017

(30) Foreign Application Priority Data

May 23, 2014   (EP) .................................... 14169577

(51) Int. Cl.
*B04B 5/06* (2006.01)
*B04B 9/02* (2006.01)
(Continued)

(52) U.S. Cl.
CPC ................ *B04B 5/08* (2013.01); *B01D 45/14* (2013.01); *B01D 45/16* (2013.01); *B04B 5/12* (2013.01);
(Continued)

(58) Field of Classification Search
CPC .... B04B 5/06; B04B 9/02; B04B 5/12; F01M 13/04; F01M 13/0416; F01M 2013/0422; B01D 45/14
(Continued)

(56) References Cited

U.S. PATENT DOCUMENTS 247,369 A    9/1881   Langen
1,650,685 A  11/1927  Behr
(Continued)

FOREIGN PATENT DOCUMENTS

CN    2390699 Y    8/2000
CN    1300240 A    6/2001
(Continued)

OTHER PUBLICATIONS

Chinese Office Action and Search Report for Chinese Application No. 201580026457.2 dated May 24, 2018, with an English translation.

*Primary Examiner* — Amber R Orlando
*Assistant Examiner* — Minh Chau T Pham
(74) *Attorney, Agent, or Firm* — Birch, Stweart, Kolasch & Birch, LLP

(57) ABSTRACT

A centrifugal separator for separation of liquid particles from a gas stream, includes a stationary frame, a gas inlet and a gas outlet. The frame comprises a tubular element defining a rotor space inside itself and a liquid transportation space outside the tubular element. A centrifugal rotor is arranged in the rotor space and rotatably supported in the frame around a rotational axis. At least one opening is provided in the tubular element, between the rotor space and the liquid transportation space, for conducting liquid separated from the gas stream from the rotor space to the liquid transportation space.

21 Claims, 2 Drawing Sheets

(51) Int. Cl.
  *B04B 5/12* (2006.01)
  *B01D 45/14* (2006.01)
  *F01M 13/04* (2006.01)
  *B04B 5/08* (2006.01)
  *B04B 7/02* (2006.01)
  *B04B 9/06* (2006.01)
  *B04B 11/02* (2006.01)
  *B01D 45/16* (2006.01)
  *B04C 9/00* (2006.01)

(52) U.S. Cl.
  CPC ............ *B04B 7/02* (2013.01); *B04B 9/06* (2013.01); *B04B 11/02* (2013.01); *B04C 9/00* (2013.01); *B04B 2005/125* (2013.01); *B04C 2009/007* (2013.01)

(58) Field of Classification Search
  USPC .......... 55/385.1, 385.3, 406; 95/270, 281; 96/228, 229, 230, 281, 282; 210/512, 3, 210/787
  See application file for complete search history.

(56) References Cited

U.S. PATENT DOCUMENTS

| | | | |
|---|---|---|---|
| 3,268,078 A | | 8/1966 | Muggli |
| 3,957,652 A | * | 5/1976 | McGonigal ............ B01D 39/10 210/498 |
| 4,478,718 A | * | 10/1984 | Saget ................ B04B 5/12 210/512.3 |
| 7,749,310 B2 | * | 7/2010 | Lagerstedt ............ B04B 5/12 55/406 |
| 7,846,343 B2 | | 12/2010 | Schook |
| 2003/0097835 A1 | | 5/2003 | Borgstrom et al. |
| 2008/0256912 A1 | | 10/2008 | Kup et al. |
| 2011/0056374 A1 | | 3/2011 | Carlsson et al. |
| 2012/0031270 A1 | | 2/2012 | Carlsoon et al. |
| 2012/0318215 A1 | * | 12/2012 | Copley ................ B01D 45/08 123/41.86 |
| 2013/0067873 A1 | * | 3/2013 | Szepessy ............... B04B 5/005 55/385.1 |
| 2014/0165977 A1 | * | 6/2014 | Copley ................ B01D 45/08 123/573 |
| 2014/0237961 A1 | * | 8/2014 | Szepessy ............... B01D 45/14 55/385.1 |
| 2015/0068172 A1 | * | 3/2015 | Andersson Aginger ........... B01D 45/14 55/385.3 |
| 2015/0345351 A1 | * | 12/2015 | Mincher ............... B01D 45/08 55/462 |
| 2016/0096129 A1 | * | 4/2016 | Kochubei .............. B01D 45/16 95/269 |

FOREIGN PATENT DOCUMENTS

| | | | | |
|---|---|---|---|---|
| CN | 101189414 A | | 5/2008 | |
| CN | 101848770 A | | 9/2010 | |
| CN | 102378650 A | | 3/2012 | |
| DE | 10 2010 015 838 A1 | | 10/2011 | |
| EP | 0 312 045 B1 | | 2/1992 | |
| EP | 3178565 A1 | * | 6/2017 | ............ B04B 1/08 |
| GB | 1 523 459 | | 8/1978 | |
| SU | 929232 | | 5/1982 | |
| WO | WO 2004/024297 A1 | | 3/2004 | |
| WO | WO 2004/091799 A1 | | 10/2004 | |
| WO | WO 2010/090578 A1 | | 8/2010 | |

\* cited by examiner

US 10,357,786 B2

CENTRIFUGAL SEPARATOR

TECHNICAL FIELD

The present invention relates generally to a centrifugal separator for separation of liquid particles from a gas stream.

BACKGROUND

WO 2010/090578 A1 discloses a centrifugal separator plant for separating oil in form of particles and/or mist from a fossil gas mixture for obtaining a separated gas. The plant comprises a centrifugal separator with a stationary casing defining a separation space. The centrifugal separator comprises an inlet for the gas mixture, a gas outlet for the separated gas and an oil outlet for discharging separated oil. A separating member for separating the gas mixture comprises a plurality of separating discs and is provided in the separation space. A drive motor is connected to the separating member via a spindle and rotates the separating member about an axis of rotation.

SUMMARY

An object of the present invention is to provide an improved centrifugal separator for separation of liquid particles from a gas stream in order to make it more suitable for use with existing vessel installations, such as pipelines for transporting gas.

Another object of the present invention is to improve the removal of liquid particles separated from a gas stream, from the separation space of the separator, and to reduce the risk of particles being reintroduced into the gas stream after centrifugal separation.

Thus the present invention relates to a centrifugal separator for separation of liquid particles from a gas stream comprising a stationary frame, a gas inlet and a gas outlet. The frame comprises a tubular element defining a rotor space inside itself and a liquid transportation space outside the tubular element. The tubular element may be a cylindrical tubular element, e.g. a circular cylindrical tube. A centrifugal rotor is arranged in the rotor space and rotatably supported in the frame around a rotational axis and comprising a separation means. A stationary device is configured to bring the gas stream in rotation, thereby bringing the rotor into rotation. At least one opening is provided in the tubular element, between the rotor space and the liquid transportation space, for conducting liquid separated from the gas stream from the rotor space to the liquid transportation space.

Thus liquid particles separated from the gas stream may be removed from the rotor space of the separator therefore reducing the risk of particles being reintroduced into the gas stream after separation.

Liquid is defined as a flowable substance and may comprise solid particulate matter.

The separation means may define a separation space wherein separation of liquid particles from the gas stream takes place, communicating with the rotor space. Thus the rotor does not need a rotor housing for delimiting the separation space. Liquid particles separated from the gas are discharged from the separation means onto the tubular element during operation of the separator.

The at least one opening may comprise a slit extending in the axial direction of rotor and provided radially outside the separation means. Thus liquid particles separated from the gas stream may be removed from the rotor space at various positions along the rotor axis, while keeping the area of the opening limited. Each slit may extend in a direction parallel to, or inclined to, the rotor axis. The inclination may be less than 60 degrees to the rotor axis, e.g. 30 degrees to the rotor axis. Alternatively, or additionally, the at least one opening may comprise a hole or an opening having another shape. The at least one opening may be formed by a plurality of small holes perforating the tubular element, at least along a portion of the tubular element. The at least one opening may be formed as a paring device, paring off liquid moving along the inside of the tubular element because of the gas flow during operation of the device.

The at least one opening may comprise a plurality of slits, distributed around the circumference of the tubular element. Thus the removal of liquid particles from the rotor space may be improved.

The slit or plurality of slits may be parallel to the rotational axis, inclined to the rotational axis, helically formed along the rotational axis etc.

The slits may extend along the axial direction of the rotor and at least partially overlap to provide an extension of openings along at least a substantial portion of the rotor. Thus liquid particles separated from the gas stream may be removed from the rotor space along a substantial portion of the rotor, while keeping the opening area limited in order to maintain a pressure drop over the openings.

The at least one slit may be inclined with respect to a radial direction to the rotational axis, such as to perform as a paring device. Thus removal of liquid particles separated from the gas stream forming a rotating liquid ring on the inside of the tubular member may be improved.

The separating means may comprise a plurality of separation plates defining separation passages between the plates. The plates may be in the form of a plurality of frustoconical separation discs. Thus the separation of liquid particles from the gas stream may be particularly efficient.

The gas inlet and gas outlet may be arranged at opposite axial end portions of the rotor. Thus the gas stream is conducted from the gas inlet, through the separation means and towards the gas outlet such that the separator is suitable for mounting in a tubular vessel, e.g. a pipeline for transporting gas.

The liquid transportation space may be formed around the circumference of the tubular element. Thus liquid entering the liquid transportation space at various positions around the tubular member may be collected in this space for removal.

The centrifugal separator may be mountable inside a vessel for guiding the gas stream, wherein the liquid transportation space is defined by the tubular element of the frame and by a wall of the vessel. The vessel may e.g. be a pipeline for transporting gas. Thus the separator may be used for removing liquid particles from a gas stream in an existing vessel, e.g. a pipeline for transporting gas.

The centrifugal separator may be mounted inside a vessel for guiding the gas stream, wherein the liquid transportation space is defined by the tubular element of the frame and by a wall of the vessel. Thus a portion of the vessel for guiding the gas stream may be comprised by the separator.

The liquid transportation space may be defined as an annular space between the tubular element and the vessel for guiding the gas stream. Thus a compact configuration of the separator is achieved, suitable for mounting inside the vessel. The vessel for guiding the gas stream may thus form an outer wall for the liquid transportation space.

The centrifugal separator may comprise two sealing means for sealing off the liquid transportation space, which preferably are arranged at opposite axial end portions of the rotor. Thus liquid entering the liquid transportation space may be collected in this space for removal.

The centrifugal separator may comprise a housing, wherein the liquid transportation space is delimited by the tubular element of the frame and the housing of the centrifugal separator. Thus the housing may form an outer wall for the liquid transportation space.

The at least one opening may be configured to maintain a pressure difference over the rotor space and the liquid transportation space obtained during operation of the separator. Thus transportation of liquid from the rotor space to the liquid transportation space may be facilitated.

The at least one opening may represent less than 10%, preferably less than 5%, or less than 1% of the area of the tubular element.

The centrifugal separator may comprise a means for creating a pressure difference over the openings during operation of the separator such as to promote liquid flow from the rotor space to the liquid transportation space. Thus the pressure in the rotor space may be maintained at a higher level than the pressure in the liquid transportation space, facilitating removal of liquid from the rotor space.

The means for creating a pressure difference may comprise a fan operationally connected to the rotor and arranged to pump gas from the liquid transportation space to the rotor space. Thus the rotation of the rotor may be used to maintain the pressure difference during operation of the separator.

The fan may preferably form part of the rotor, thus being connected to the rotor axis.

The means for creating a pressure difference may comprise a pressure transmitting connection provided from a central portion of the rotor space to the liquid transportation space, preferably one or more tubular connections.

During operation of the separator, gas flowing through the separator will be subjected to a pressure drop over the separation means of the rotor. Therefore the pressure at a radially outer portion of the rotor space will be higher than the pressure at a central portion of the rotor. Also the rotation of the flowing gas itself will result in the pressure at a radially outer portion of the rotor space will be higher than the pressure at a central portion of the rotor. Thus a pressure difference over the rotor space and the liquid transportation space may be obtained by connecting the liquid transportation space to a central portion of the rotor space.

The separator may further comprise means for draining liquid from the liquid transportation space. This means may comprise one or more openings in the tubular member, for drainage of liquid by means of gravitation and/or a pressure difference. These openings may be connected to drainage tubing extending inside the gas conducting vessel. The openings may alternatively or additionally lead to the outside of the gas conducting vessel for drainage of liquid by means of pumping and/or gravitation to the outside of the vessel.

The centrifugal separator may comprise a liquid guiding means arranged on the inside of the tubular element and configured to guide liquid separated from the gas stream from the rotor space to the at least one opening in the tubular element. Thus the transportation of liquid separated from the gas stream from the rotor space to the liquid transportation space may be improved.

The liquid guiding means may comprise a helical or inclined strip element leading to the at least one opening in the tubular element. Thus liquid may be guided along the helical or inclined strip element to the at least one opening in the tubular element by means of the gas stream in the separator. The tubular element may be provided with a plurality of small openings along the helical or inclined strip element, to effectively remove liquid separated from the gas stream from the rotor space to the liquid transportation space while keeping the area of the openings small, to maintain a pressure difference over the openings.

BRIEF DESCRIPTION OF THE DRAWINGS

The invention is now described, by way of example, with reference to the accompanying drawings, in which.

DESCRIPTION OF EMBODIMENTS

Figure 1:
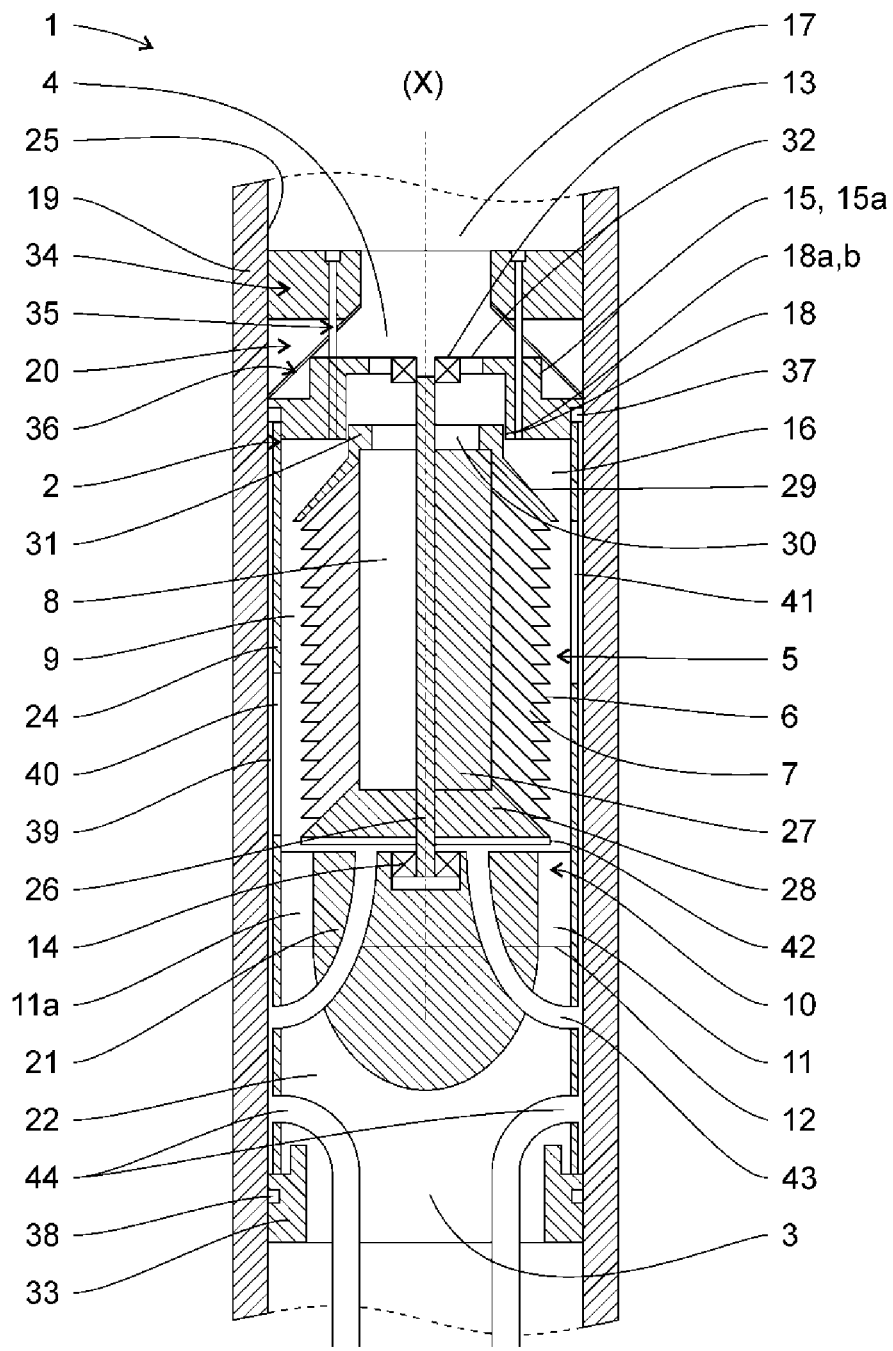
FIG. 1 shows a cross-section along the rotational axis of a centrifugal separator according to the invention, arranged in a cylindrical vessel for conveying a gas stream.

In FIG. 1 a centrifugal separator 1 for separation of particles from a gas stream is shown arranged in a cylindrical vessel 19 in the form of a cylindrical pipe for guiding the gas stream. The separator comprises a self-supporting frame 2 for mounting inside the vessel 19. Self-supporting is understood as an ability of the frame to support itself without relying on support from the vessel such as during mounting and dismounting. The frame is provided with a first partition 15 for dividing the vessel into a first section 16 upstream of the partition and a second section 17 downstream of the partition. The separator further comprises a gas inlet 3 communicating with the first section and a gas outlet 4 communicating with the second section.

The centrifugal separator further comprises a centrifugal rotor 5 arranged to be rotatable in the frame around a rotational axis x. The rotor comprises separation means in the form of a plurality of separation discs 6. The rotational axis extends in the direction of the extension of the vessel. The rotor comprises a shaft 26 having a first and a second end portion. The first end portion is supported in a first frame portion 15a by means of a first bearing 13. The first frame portion 15a comprises the first partition 15. The second end portion is supported in the frame by means of a second bearing 14 held in a second frame portion 21. The rotor comprises a disc support structure 27 connected to the rotor axis and extending between the first and second end portions of the rotor axis. The disc support structure has a number of plate like wings extending along the rotor axis and radially outwards from the rotor axis, in this case three wings. In an alternative embodiment the disc support structure comprises two or more wings, such as six wings. Towards the second end portion of the rotor axis, a bottom disc 28 is attached to the wings of the disc support structure. The plurality of frustoconical separation discs 6 are stacked on the bottom disc, and guided by the radially outer portions of the plate like wings. The separation discs may be made of a lightweight material such as plastic, or of metal such as stainless steel or titanium. The separation discs are each provided with distance members in order to provide separation passages 7 between the discs in the stack. The distance members are in the form of elongated protrusions extending from a radially inner portion to a radially outer portion of each separation disc, having an extension along a line or a curve. The elongated distance members, or caulks, may be straight or curved and may be integrated in the discs or attached to the discs. The distance members may alternatively or additionally comprise distance members in the form of dot-shaped caulks or microcaulks, distributed over the surface of the separation discs. On top of the stack of separation discs a top disc 29 is provided. The top disc is attached to the wings of the disc support structure. The stack of separation discs are compressed by the top disc and the bottom disc. Radially inside the separation discs a central gas space 8 is formed, divided by the wings of the disc support structure 27. The top disc is provided with a central opening 30 such that the central gas space of the rotor is open for passage of gas through the top disc. The top disc is provided with a flange 31 circumventing the central opening providing a cylindrical outer sealing surface, 18*a*.

A narrow gap is formed between a sealing surface 18*a* formed on the flange 31 of the top disc and a corresponding cylindrical sealing surface 18*b* on the first partition. The gap forms a gap sealing 18 between the first 16 and second 17 sections in the vessel. The central gas chamber 8 in the rotor communicates with a radially inner portion of the separation passages 7 and the gas outlet 4 via the central opening of the top disc and openings 32 formed in the first partition, surrounding the first bearing 13. Further, a rotor space 9 is formed radially outside and surrounding the rotor. The rotor space 9 surrounding the rotor communicates with the radially outer portion of the separation passages 7 and the gas inlet 3. The centrifugal separator is configured such that the first and second sections of the vessel communicate via the separation passages 7 of the rotor.

The frame comprises a bottom sealing ring 33 forming the gas inlet 3 in the frame. The bottom sealing ring is sealingly connected, 38, to the inner vessel wall 25. A tubular element in the form of a cylindrical frame tube 24 extends along the inner wall of the vessel as a part of the frame, from the bottom sealing ring to the first partition 15 and connects with the other parts of the frame to provide a self-supporting frame structure. The second frame portion 21 supporting the second bearing 14 is connected to and supported by the inner wall of the cylindrical frame tube.

The tubular element 24 thus defines the rotor space 9 inside itself. Between the wall of the cylindrical vessel 19 and the tubular element 24 a liquid transportation space 39 is formed for transport of liquid outside the rotor space. At least one, in this case two, openings 40 and 41 in the form of narrow slits are provided in the tubular element, between the rotor space 9 and the liquid transportation space 39, for conducting liquid separated from the gas stream from the rotor space to the liquid transportation space. The openings may also be in the form of one or more holes arranged around the rotor.

Figure 2:
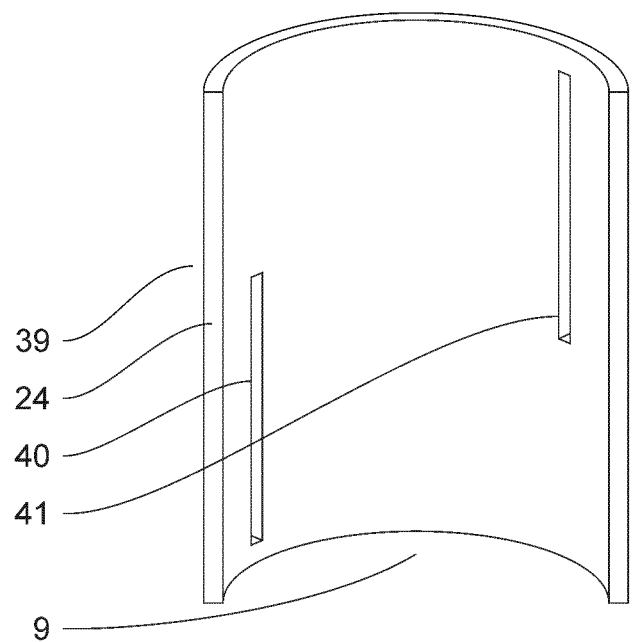
FIG. 2 shows a section of the tubular element with slits for conducting liquid.

The configuration of the slits is further shown in FIG. 2, where a section of the tubular element is shown. Two slits 40 and 41 are provided as openings between the rotor space 9 and the liquid transportation space 39. The slits extend in the axial direction of rotor and are provided radially outside the separation discs 6. The slits are distributed around the circumference of the tubular element, in this case at opposite sides of the tubular element. The slits are distributed along the axis of the rotor and partially overlap to provide an opening along at least a substantial portion of the rotor.

The slits may extend in a purely radial direction or may be inclined with respect to the radial direction in order to perform as a paring device for liquid rotating along the inner side of the wall of the tubular element during operation of the separator, transporting liquid from the rotor space to the liquid transportation space.

Figure 3:
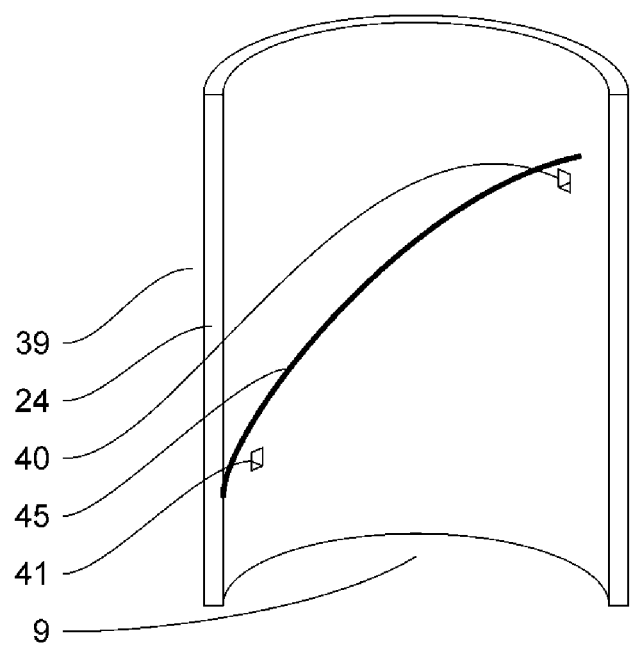
FIG. 3 shows a section of the tubular element with a helical strip element for leading liquid.

In FIG. 3 an alternative embodiment is shown wherein the openings 40 and 41 are formed as small holes in the tubular element, and wherein a helical strip element 45 is arranged leading to the openings to guide liquid separated from the gas stream from the rotor space to the openings. The openings are preferably arranged on the side of the helical strip element meeting the gas stream during operation of the separator. Thereby liquid separated from the gas stream from the rotor space may effectively be removed to the liquid transportation space while maintaining keeping the area of the openings small, to maintain a pressure difference over the openings.

Again turning to FIG. 1, the frame 2 further comprises a holding means 20 to hold the frame at a position inside the vessel. The holding means comprises a ring shaped part 34 sealingly connected, by means of a sealing member 37, to the inner vessel wall 25. The holding means is configured to engage with the cylindrical inner surface of the vessel by providing an expandable outer diameter. Thus the liquid transportation space is sealed by means of the bottom sealing ring 33 and the ring shaped part 34.

The separator is provided with a means for creating a pressure difference over the openings 40 and 41, comprising a fan 42 formed by an end portion of the rotor 5. The fan is formed by the outer/lower face of the bottom disc 28 of the rotor. The fan may be provided with pumping means in the form of ridges, channels or protrusions to enhance pumping action. The fan is arranged to pump gas from the liquid transportation space to the rotor space. Therefore the radially inner portion of the fan is connected to the liquid transportation space 39 through tubing 43. Thus the rotation of the rotor may be used to maintain the pressure difference during operation of the separator.

Close to the bottom sealing ring, the separator is provided with means to drain liquid from the liquid transportation space. One or more drainage tubes 44 are connected to the liquid transportation space via openings in the tubular member 24. The drainage of liquid from the liquid transportation space may thus be operated by means of gravity. Alternatively, or additionally, liquid may be drained from the liquid transportation space by means of a pressure difference, e.g. by externally applied pumping.

The centrifugal separator comprises a stationary device 10 configured to bring the gas stream in rotation. The device 10 configured to bring the gas stream in rotation is positioned upstream of the rotor and formed in the second frame portion 21. The device 10 comprises a ring shaped gas deflecting member 11 comprising a plurality of vanes 12 extending outwardly from the ring shaped member and distributed around the rotational axis of the rotor. The vanes are inclined with respect to the axial direction x of the centrifugal rotor. The inclination is gradually increased along the length of the vanes in the direction of the flowing gas. The vanes are arranged in a passage 11*a* formed in the second frame portion upstream of the rotor. The passage 11*a* extends radially outside the separation plates of the centrifugal rotor.

The separator is mounted in the vessel 19 by placing the separator with its self-supporting frame 2 at a desired position inside the vessel. The separator may be fixed inside the vessel by expanding the diameter of the holding means 20 so that the holding means engage with the inner surface 25 of the vessel, to hold the separator at the desired position inside the vessel. Alternatively the vessel may comprise a flange, wherein the frame is configured to cooperate with the flange of the vessel, such that it is releasably connected to the flange of the vessel. Thus the centrifugal separator may be mountable to vessels provided with pipe flanges connecting two sections of the vessel. The centrifugal separator may also be mountable in a circumventing recess provided in the wall of a vessel, for example in connection with a pipe flange, whereby the holding means is configured to engage with the recess.

During operation of the centrifugal separator a stream of gas enters into the inlet 3 of the centrifugal separator 1. The stream of gas is forced into the passage 11*a* where the inclined vanes 12 deflect the gas towards a tangential direction of the rotor of the separator. Thus the gas stream is brought into rotation by the vanes 12, and enters into the rotor space 9. In this space a pre-separation occurs whereas larger particles in the form of solid particles and/or liquid droplets having a density larger than the gas in the gas stream are separated from the gas stream by means of centrifugal forces in the rotating gas stream and deposited on the inner surface of the cylinder 24.

From the rotor space 9, the rotating gas stream enters into the separation passages 7 formed between the separation discs 6 in the rotor. The rotor 5 is brought into rotation by the rotating gas stream by means of viscous forces acting on the separation discs in the separation passages. The rotation of the rotor is also facilitated by the elongated distance members of the disc stack working as vanes or turbine blades to improve the transfer of momentum from the gas stream to the rotor. Since the rotating gas stream is led from the radially outer portions of the separation passages and towards the radially inner portions of the separation passages, the gas stream is spun up thanks to the conservation of angular momentum. Thus the transfer of the rotation from the gas to the rotor is particularly efficient in this configuration.

In the separation passages, particles in the form of solid particles and/or liquid droplets having a density larger than the gas in the gas stream are separated from the gas stream by centrifugal forces. Due to the smaller separation distances in the separation passages of the stack of frustoconical discs this even allows for separation of smaller and/or less dense particles from the gas stream. Particles separated from the gas stream are deposited on the inner surface of the frustoconical separation discs and transported radially outwardly by means of centrifugal forces. From the radially outer edge of the separation discs, particles separated from the gas stream in the separation passages are thrown towards and deposited at the inner surface of the tubular cylinder element 24.

The liquid particles form a liquid ring on the inner surface of the tubular cylinder element 24. The liquid ring rotates with the rotational flow of the gas stream. From this inner surface, liquid substance flows through the slits 40 and 41 into the liquid transportation space 39. The removal of the liquid is facilitated by a pressure difference maintained over the slits by means of the fan 28.

The fan 28 rotates with the rotor 5. During operation, gas is pumped from the radially inner portion of the fan and outwards. Thus gas is pumped from the liquid transportation space via the tubing 43 thus maintaining the pressure difference over the slits.

Liquid collected in the liquid transportation space 39 is drained there from through the tubing 44 for removal from the vessel 19.

Cleaned gas conducted towards the central gas chamber 8 of the rotor is provided to the outlet 4 through the passages 30 and 32 formed in the rotor and the first partition, and transported from the separator through the vessel 19.

The invention claimed is:

1. A centrifugal separator for separation of liquid particles from a gas stream, comprising:
   a tubular element defining a rotor space therein and a liquid transportation space outside the tubular element, the tubular element having a sidewall, a first end and a second end;
   a gas inlet in the second end of the tubular element;
   a gas outlet in the first end of the tubular element;
   a centrifugal rotor rotatably supported in the tubular element and comprising a separator; and
   a stationary device between the inlet and tubular element to bring the gas stream in rotation, thereby bringing the rotor into rotation,
   wherein at least one opening is provided in the tubular element, between the rotor space and the liquid transportation space, for conducting liquid separated from the gas stream from the rotor space to the liquid transportation space.

2. The centrifugal separator according to claim 1, wherein the at least one opening comprises a slit extending in the axial direction of the rotor and provided radially outside the separator.

3. The centrifugal separator according to claim 1, wherein the at least one opening comprises a plurality of slits, distributed around the circumference of the tubular element.

4. The centrifugal separator according to claim 3, wherein the slits extend along the axial direction of the rotor and at least partially overlap to provide an extension along at least a substantial portion of the rotor.

5. The centrifugal separator according to claim 2, wherein the at least one slit is inclined with respect to a radial direction to the rotational axis, such as to perform as a paring device.

6. The centrifugal separator according to claim 1, wherein the separator comprises a plurality of separation plates defining separation passages between the plurality of separation plates.

7. The centrifugal separator according to claim 1, wherein the liquid transportation space is formed around the circumference of the tubular element.

8. The centrifugal separator according to claim 1, wherein the centrifugal separator is mountable inside a vessel for guiding the gas stream, and
   wherein the liquid transportation space is defined by the tubular element and by a wall of the vessel.

9. The centrifugal separator according to claim 8, further comprising two sealing devices configured to seal off the liquid transportation space, which sealing devices are arranged at opposite axial end portions of the rotor.

10. The centrifugal separator according to claim 1, further comprising a housing, wherein the liquid transportation space is delimited by the tubular element and the housing of the centrifugal separator.

11. The centrifugal separator according to claim 1, wherein the at least one opening is configured to maintain a pressure difference over the rotor space and the liquid transportation space obtained during operation of the separator.

12. The centrifugal separator according to claim 1, wherein the at least one opening represents less than 10% of the area of the tubular element.

13. The centrifugal separator according to claim 1, further comprising a device configured to create a pressure difference over the openings during operation of the separator such as to promote liquid flow from the rotor space to the liquid transportation space.

14. The centrifugal separator according to claim 1, further comprising a fan operationally connected to the rotor and arranged to pump gas from the liquid transportation space to the rotor space.

15. The centrifugal separator according to claim 14, wherein the fan forms part of the rotor.

16. The centrifugal separator according to claim 13, wherein the device configured to create a pressure difference comprises a pressure transmitting connection provided from a central portion of the rotor space to the liquid transportation space.

17. The centrifugal separator according to claim 1, further comprising a drain for draining liquid from the liquid transportation space.

18. A centrifugal separator for separation of liquid particles from a gas stream, comprising:
   a tubular element defining a rotor space therein and a liquid transportation space outside the tubular element, the tubular element having a sidewall, a first end and a second end;
   a gas inlet in the second end of the tubular element;
   a gas outlet in the first end of the tubular element; and
   a centrifugal rotor rotatably supported in the tubular element and comprising a separator;
   wherein at least one opening is provided in the tubular element for conducting liquid separated from the gas stream from the rotor space to the liquid transportation space, and
   wherein a liquid guide is arranged on the inside of the tubular element and is configured to guide liquid from the rotor space to the at least one opening in the tubular element.

19. The centrifugal separator according to claim 18, wherein the liquid guide comprises a helical or inclined strip element or groove leading to the at least one opening in the tubular element.

20. The centrifugal separator according to claim 1, further comprising a partition extending along the first end of the tubular element,
   wherein the gas outlet is formed in the partition.

21. A centrifugal separator for separation of liquid particles from a gas stream, comprising:
   a tubular element defining a rotor space therein and a liquid transportation space outside the tubular element, the tubular element having a sidewall, a first end and a second end;
   a gas inlet in the second end of the tubular element;
   a gas outlet in the first end of the tubular element; and
   a centrifugal rotor rotatably supported in the tubular element and comprising a separator;
   wherein at least one opening is provided in the tubular element for conducting liquid separated from the gas stream from the rotor space to the liquid transportation space,
   wherein the centrifugal separator is mountable inside a vessel for guiding the gas stream, and
   wherein the liquid transportation space is defined by the tubular element and by a wall of the vessel.

* * * * *